(12) United States Patent
Fink et al.

(10) Patent No.: US 8,466,776 B2
(45) Date of Patent: Jun. 18, 2013

(54) EXTENDED RANGE PASSIVE WIRELESS TAG SYSTEM AND METHOD

(75) Inventors: Patrick W. Fink, Missouri City, TX (US); Timothy F. Kennedy, Houston, TX (US); Gregory Y. Lin, Friendswood, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 431 days.

(21) Appl. No.: 12/828,558

(22) Filed: Jul. 1, 2010

(65) Prior Publication Data

US 2012/0001735 A1   Jan. 5, 2012

(51) Int. Cl.
*H04Q 5/00* (2006.01)
*H01L 41/107* (2006.01)
*H01Q 19/00* (2006.01)

(52) U.S. Cl.
USPC ............ 340/10.4; 310/313 R; 340/572.7; 342/7; 342/370; 343/754

(58) Field of Classification Search
USPC ..... 310/313 B, 313 R; 340/10.1, 10.3–10.42, 340/572.1, 572.5, 572.7; 342/6–7, 42, 44, 342/46, 51, 175, 187, 353, 367, 370; 343/776, 343/844, 893, 912, 755; 455/106
See application file for complete search history.

(56) References Cited

U.S. PATENT DOCUMENTS

| | | | |
|---|---|---|---|
| 2,908,002 A | | 10/1959 | Van Atta |
| 3,898,663 A | * | 8/1975 | Albert ........................ 342/187 |
| 4,169,286 A | | 9/1979 | Uzunoglu et al. |
| 4,401,956 A | * | 8/1983 | Joshi ........................... 333/152 |
| 4,746,830 A | * | 5/1988 | Holland ................... 310/313 D |
| 5,254,997 A | | 10/1993 | Cohn |
| 5,361,071 A | | 11/1994 | van Zon |
| 5,365,207 A | * | 11/1994 | Borras et al. ................. 333/196 |
| 5,387,916 A | * | 2/1995 | Cohn .............................. 342/44 |
| 5,945,938 A | * | 8/1999 | Chia et al. ...................... 342/42 |
| 6,100,840 A | | 8/2000 | Zidek et al. |
| 6,369,772 B1 | * | 4/2002 | Forster ......................... 343/850 |
| 6,388,360 B1 | * | 5/2002 | Nysen et al. .............. 310/313 R |
| 6,563,425 B2 | | 5/2003 | Nicholson et al. |
| 6,812,841 B2 | | 11/2004 | Heinrich et al. |

(Continued)

OTHER PUBLICATIONS

Shyh-Jong Chung et al.; "A Novel Bi-Directional Amplifier with Applications in Active Van Atta Retrodirective Arrays"; IEEE; published in IEEE Transactions on Microwave Theory and Techniques, Vil. 51, No. 2; Feb. 2003.*

(Continued)

*Primary Examiner* — Benjamin C Lee
*Assistant Examiner* — Stephen Burgdorf
(74) *Attorney, Agent, or Firm* — Kurt G. Hammerle

(57) ABSTRACT

A passive wireless tag assembly comprises a plurality of antennas and transmission lines interconnected with circuitry and constructed and arranged in a Van Atta array or configuration to reflect an interrogator signal in the direction from where it came. The circuitry may comprise at least one surface acoustic wave (SAW)-based circuit that functions as a signal reflector and is operatively connected with an information circuit. In another embodiment, at least one delay circuit and/or at least one passive modulation circuit(s) are utilized. In yet another embodiment, antennas connected to SAW-based devices are mounted to at least one of the orthogonal surfaces of a corner reflector.

16 Claims, 10 Drawing Sheets

U.S. PATENT DOCUMENTS

| | | | |
|---|---|---|---|
| 6,827,281 B2 | 12/2004 | Edmonson et al. | |
| 6,958,696 B2 * | 10/2005 | Hartmann et al. | 340/572.1 |
| 7,075,413 B2 | 7/2006 | Friedman | |
| 7,084,768 B2 * | 8/2006 | Hartmann et al. | 340/572.7 |
| 7,136,683 B2 | 11/2006 | Eisenhower, Jr. et al. | |
| 7,195,159 B2 | 3/2007 | Sloan et al. | |
| 7,196,626 B2 | 3/2007 | Chen et al. | |
| 7,434,989 B2 | 10/2008 | Solie | |
| 7,642,898 B1 * | 1/2010 | Malocha et al. | 340/10.41 |
| 2006/0087406 A1 | 4/2006 | Willins et al. | |
| 2006/0158333 A1 | 7/2006 | Garber et al. | |
| 2007/0008140 A1 | 1/2007 | Saarisalo et al. | |
| 2007/0057792 A1 | 3/2007 | Alden | |
| 2007/0075831 A1 | 4/2007 | Grego | |
| 2007/0282172 A1 * | 12/2007 | Toumazou et al. | 600/300 |
| 2010/0060429 A1 * | 3/2010 | Hines et al. | 340/10.1 |
| 2012/0106659 A1 * | 5/2012 | Fireaizen et al. | 375/259 |

OTHER PUBLICATIONS

Sung-Nien Hsieh et al.; "Linear Retro-Directive Antenna Array Using 90 Degree Hybrids"; IEEE; published in IEEE Transactions on Antennas and Propagation, vol. 56, No. 6; Jun. 2008.*
http://www3.sympatico.ca/colin.kydd.campbell; pp. 1-32.

* cited by examiner

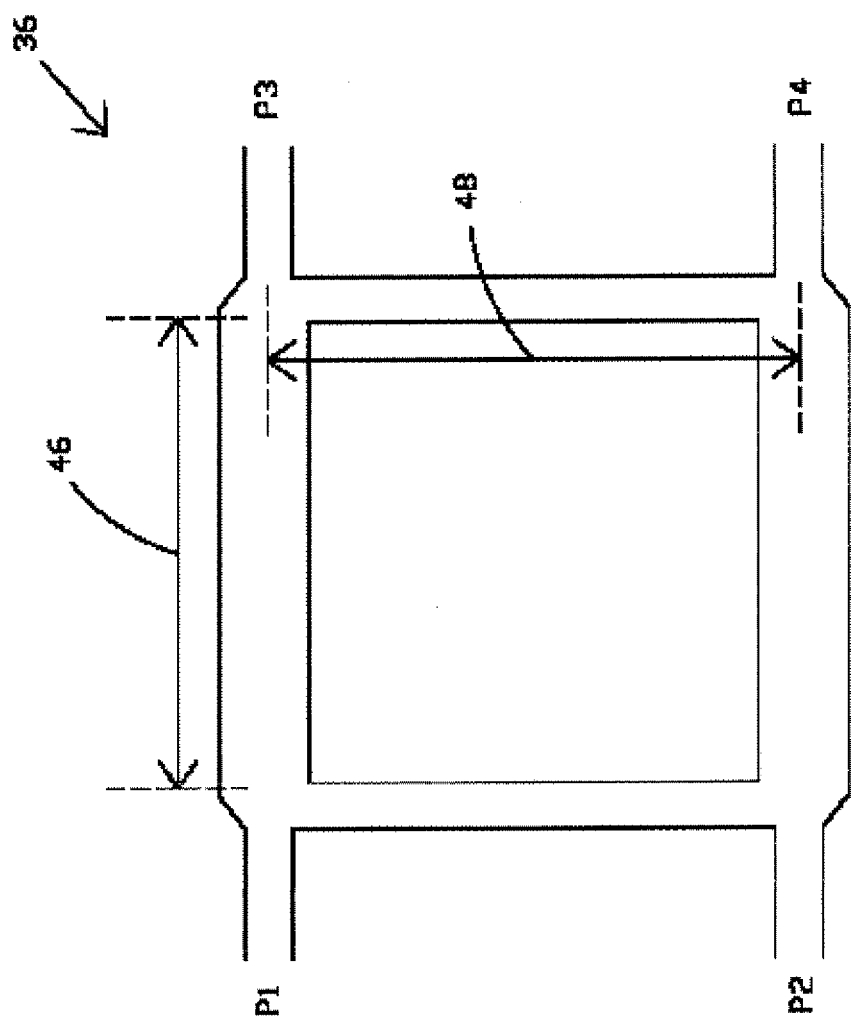

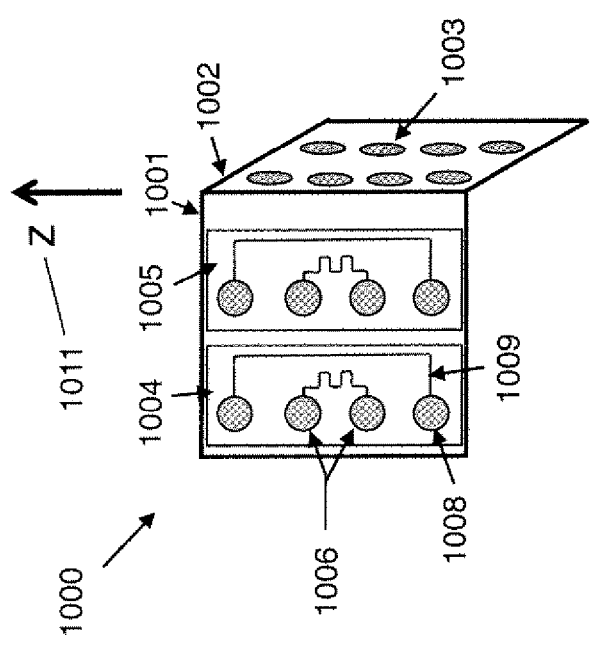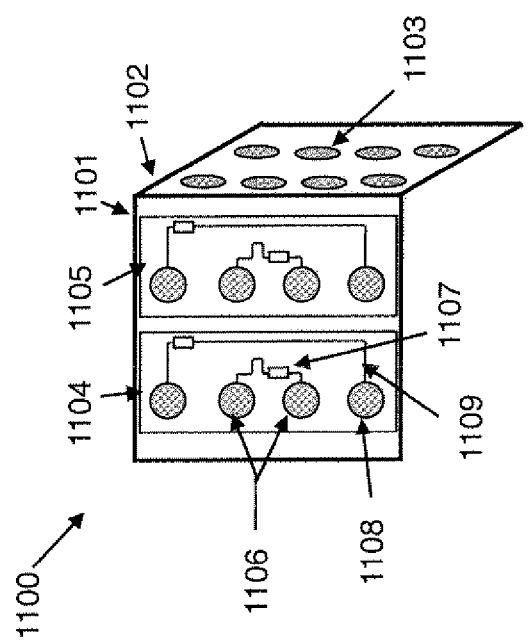

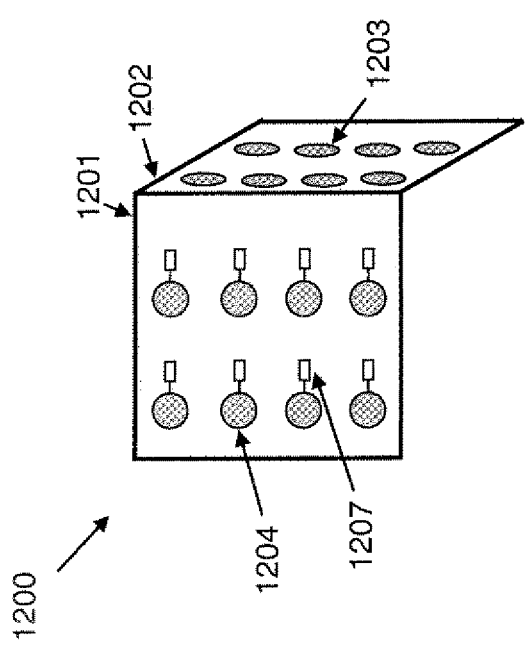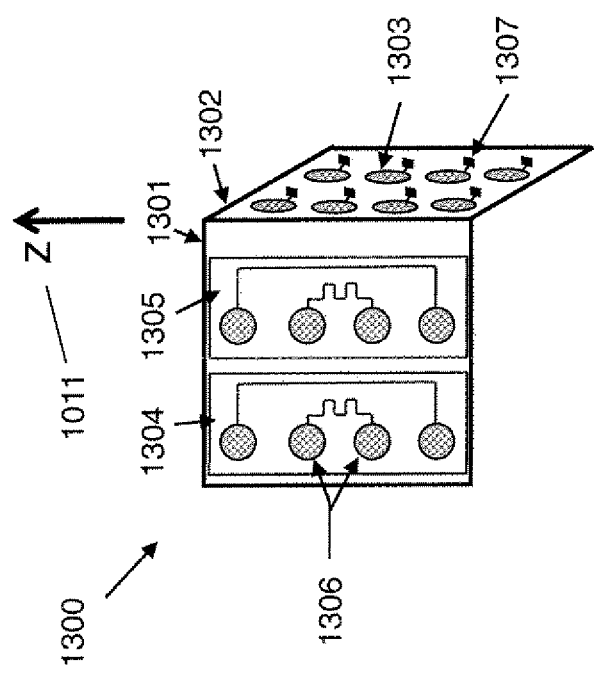

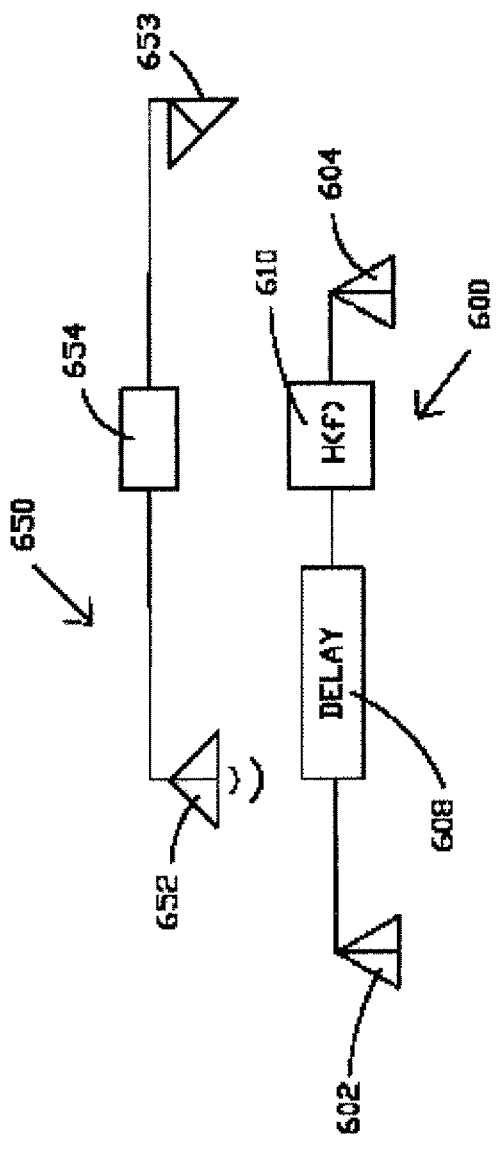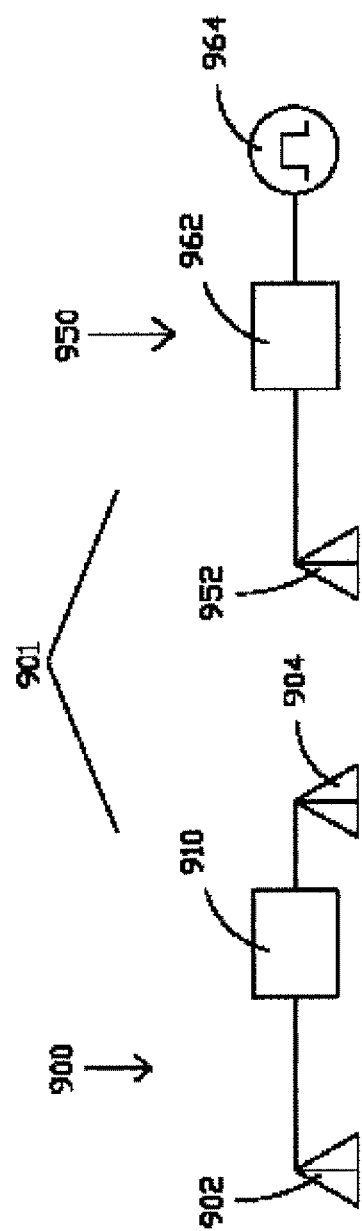

EXTENDED RANGE PASSIVE WIRELESS TAG SYSTEM AND METHOD

ORIGIN OF THE INVENTION

The invention described herein was made by employee(s) of the United States Government and may be manufactured and used by or for the Government of the United States of America for governmental purposes without the payment of any royalties thereon or therefor.

FIELD OF THE INVENTION

The present invention relates generally to passive wireless radio frequency identification (RFID) systems. More particularly, the invention relates to configurations of passive surface acoustic wave (SAW)-based wireless RFID transponders or tags that may include identifiers and/or sensors, which are configured with multiple antennas to steer the radio wave response of the tag in the direction of an interrogator.

SUMMARY OF THE INVENTION

Described herein are various embodiments of a radio frequency identification (RFID) system and of components for such system, including a passive wireless tag assembly comprising at least one passive wireless tag responsive to a wireless interrogator signal from an interrogator by reflecting a return signal derived from the wireless interrogator signal. The return signal may contain information added by the passive wireless tag.

One embodiment of the passive wireless tag assembly may comprise at least one circuit such as a surface acoustic wave (SAW) circuit, also known as a SAW device, constructed and arranged for receiving an incoming electromagnetic wave, transforming the incoming electromagnetic wave into a surface acoustic wave, and then transforming the surface acoustic wave back into a subsequently outgoing electromagnetic wave as the return signal. An information circuit or an information mechanism may be provided that is operable for adding information to at least one of the electromagnetic wave, the surface acoustic wave, and the subsequently outgoing electromagnetic wave. The information circuit or mechanism may be operable for providing a passive wireless tag identification number as the added information, or the information circuit or mechanism may be operable for making a measurement of at least one physical phenomena and providing information from the measurement as the added information. The information circuit or information mechanism may be integrated with the SAW-based device(s) or may be externally provided. A plurality of antennas and transmission lines may be interconnected with the SAW device(s) and the information circuit or information mechanism to provide a passive wireless tag assembly for receiving the wireless interrogator signal and transmitting the return signal in a direction from whence the interrogator signal came.

In another embodiment, the passive wireless tag assembly may comprise a first conductive surface and a second conductive surface connected at a right angle to one another to form a corner reflector. The plurality of antennas may be positioned on the first conductive surface and the second conductive surface.

In yet another embodiment, the passive wireless tag assembly may comprise a plurality of SAW-based signal reflectors. Each of the plurality of SAW-based signal reflectors may comprise a single port. Each of this plurality of SAW-based signal reflectors may be operable for receiving the incoming electromagnetic wave at the single port, transforming the electromagnetic wave into the surface acoustic wave, and then transforming the surface acoustic wave back into the subsequently outgoing electromagnetic wave for transmission from the single port. The passive wireless tag assembly may also further comprise at least one hybrid coupler connected to each of the plurality of SAW-based signal reflectors. In another embodiment, the plurality of SAW-based signal reflectors are matched so that each of the plurality of SAW-based signal reflectors have a tolerance of plus/minus 10% with respect to each other for magnitude response and +/−10° with respect to each other for phase response of the subsequently outgoing electromagnetic wave as the return signal.

In another embodiment, the passive wireless tag assembly may comprise at least one SAW device that comprises at least two signal ports. In this embodiment, the SAW device may be operable for receiving the incoming electromagnetic wave at a first of the at least two signal ports, transforming the electromagnetic wave into the surface acoustic wave, and then transforming the surface acoustic wave back into the subsequently outgoing electromagnetic wave for transmission from a second of the at least two signal ports.

In another embodiment, the information circuit or information mechanism may comprise a frequency responsive circuit such as a filter. For example, the filter may comprise a plurality of pass bands and stop bands that are organized or coded in a desired way to contain information.

In another embodiment, the passive wireless tag may comprise a plurality of resonators, each resonating at the same or different frequencies. In this embodiment, the SAW-based device may be configured to produce time delays between the plurality of resonators. In yet another embodiment, the SAW-based device may comprise a dispersive filter.

In another embodiment, a method for increasing the signal range of response for a passive wireless tag assembly responding to a wireless interrogator signal from an interrogator is provided. The method comprises the steps of receiving the wireless interrogator signal as an incoming electromagnetic wave, transforming the incoming electromagnetic wave into a surface acoustic wave, adding information to the surface acoustic wave, transforming the surface acoustic wave with added information into a subsequent reflected electromagnetic wave, and creating a time reversal of the incoming electromagnetic signal such that the subsequent reflected electromagnetic wave transmits predominantly in a direction from whence the interrogator signal came.

In another embodiment, the passive wireless tag assembly may comprise at least one hybrid coupler and a plurality of SAW-based devices operable for receiving an incoming electromagnetic wave, transforming the electromagnetic wave into a surface acoustic wave, and then transforming the surface acoustic wave back into a subsequent electromagnetic wave as the return signal. At least one pair of antennas may be interconnected by transmission lines with the plurality of SAW-based devices and the hybrid coupler(s). The interconnected components are configured to receive the wireless interrogator signal and transmit the return signal such that it is focused in a direction from whence the interrogator signal came.

In another embodiment, a passive wireless tag RFID system for tag "reflection mode" operation is provided. Tag "reflection mode" operation is defined herein as meaning SAW-based circuits that comprise one signal port in which the incident signal is received by the SAW circuit, modified by the SAW circuit, and returned by the SAW circuit through the same signal port. The system may comprise an interrogator operable to produce a wireless interrogator signal and a passive wireless tag. The wireless tag may comprise at least one delay circuit operable for delaying an electromagnetic wave by a predetermined time delay, τ. At least one passive modulation circuit may comprise a transfer function that is a function of frequency. The passive modulation circuit is operable for producing information for modifying said wireless interrogator signal based on the properties of the transfer function. For example, in one embodiment, the transfer function defines a plurality of frequency pass bands and frequency stop bands which are coded to provide the information. In another embodiment, the transfer function is determined by a series of SAW-based signal reflectors with established spacing to passively encode the wireless interrogator signal.

In another embodiment, the passive wireless tag may be configured for tag "through-mode" operation. Tag "through mode" operation is defined herein as meaning SAW-based circuits that comprise two or more signal ports in which the incident signal from the interrogator is received by the SAW circuit at one of the two or more signal ports, modified by the SAW circuit, and returned by the SAW circuit through a different one of the two or more signal ports. In one of many possible through-mode embodiments, the passive modulation circuit comprises a plurality of parallel passband resonators and a plurality of parallel delay elements operable to produce a plurality of time delays between the plurality of passband resonators, wherein information might be coded into the delays and particular frequency bands of the passband resonators. A plurality of antennas and transmission lines may be interconnected with the delay circuit(s) and passive modulation circuit(s). The interconnected components are constructed and arranged to receive the wireless interrogator signal and transmit a return signal that is focused in a direction from whence the interrogator signal came.

It is noted that, as described herein for application in passive wireless tag assemblies, a circuit constructed to operate in "reflection mode" can typically be effectively converted to operate in "through mode" by application of a coupler such as a hybrid coupler described herein.

In yet another embodiment, the interconnected components are configured to produce at least three signals in response to the wireless interrogator signal wherein only the return signal is steerable in the direction from whence the interrogator signal came. In this embodiment, the return signal is received at the interrogator at a time $t \approx \tau + t_0$ where $t_0$ is a two-way propagation delay corresponding to a two-way travel time of a distance between the interrogator and the passive wireless tag. A first additional non-steered signal may be received by the interrogator at a time $t \approx t_0$. A second additional non-steered signal may be received by the interrogator at a time $t \approx 2\tau + t_0$.

In another embodiment, the interrogator may comprise a matched filter operable for maximizing a received signal-to-noise ratio of the return signal. In yet another embodiment, the interrogator may comprise a pulse generator and at least one first filter for producing a wireless interrogator signal. The passive wireless tag may comprise at least one second filter, wherein the first filter is a conjugate response to the second filter. A plurality of antennas and transmission lines are interconnected with the second filter(s) and constructed and arranged to receive the wireless interrogator signal and transmit a return signal in a direction from whence the interrogator signal came.

The embodiments described herein may provide a strictly passive wireless tag, rather than a pseudo passive wireless tag with rectifiers for rectifying the interrogator signal. In the embodiments described, the passive wireless tag contains no DC power supply, such as might be used to provide for the biasing of integrated circuits, or for the means for rectifying the signal received from the interrogator. Thus, the embodiments described herein may not require a minimum received voltage level.

Other aspects of the embodiments described herein will become apparent from the following description and appended claims, taken in conjunction with the accompanying drawings, illustrating the principles of the embodiments by way of example only.

BRIEF DESCRIPTION OF THE DRAWINGS

FIG. 2 is a top view of a hybrid branchline, directional coupler component that may be utilized in accordance with at least one embodiment;

FIG. 5A illustrates a hybrid, dihedral-Van Atta "corner" retro-reflector comprising array elements to provide vertical and horizontal steering in accordance with an embodiment of a passive wireless RFID sensor assembly;

FIG. 5B represents a hybrid dihedral-Van Atta corner retro-reflector comprising array elements and passive modulation circuits to provide vertical steering, horizontal steering, and reflector identification in accordance with an embodiment of a passive wireless tag assembly;

FIG. 5C shows a hybrid dihedral retro-reflector comprising array elements and SAW-based devices to provide horizontal steering and reflector identification in accordance with another embodiment of a passive wireless tag assembly;

FIG. 5D demonstrates a hybrid dihedral retro-reflector comprising array elements and passive modulation devices to provide vertical steering, horizontal steering, and reflector identification in accordance with another embodiment of a passive wireless tag assembly;

FIG. 6 is a schematic for an extended range passive wireless RFID tag further comprising a delay and transfer function in accordance with another embodiment;

FIG. 9 depicts a passive wireless tag assembly further comprising a dispersive filter in accordance with yet another embodiment.

DETAILED DESCRIPTION OF EXEMPLARY EMBODIMENTS

Figure 1:
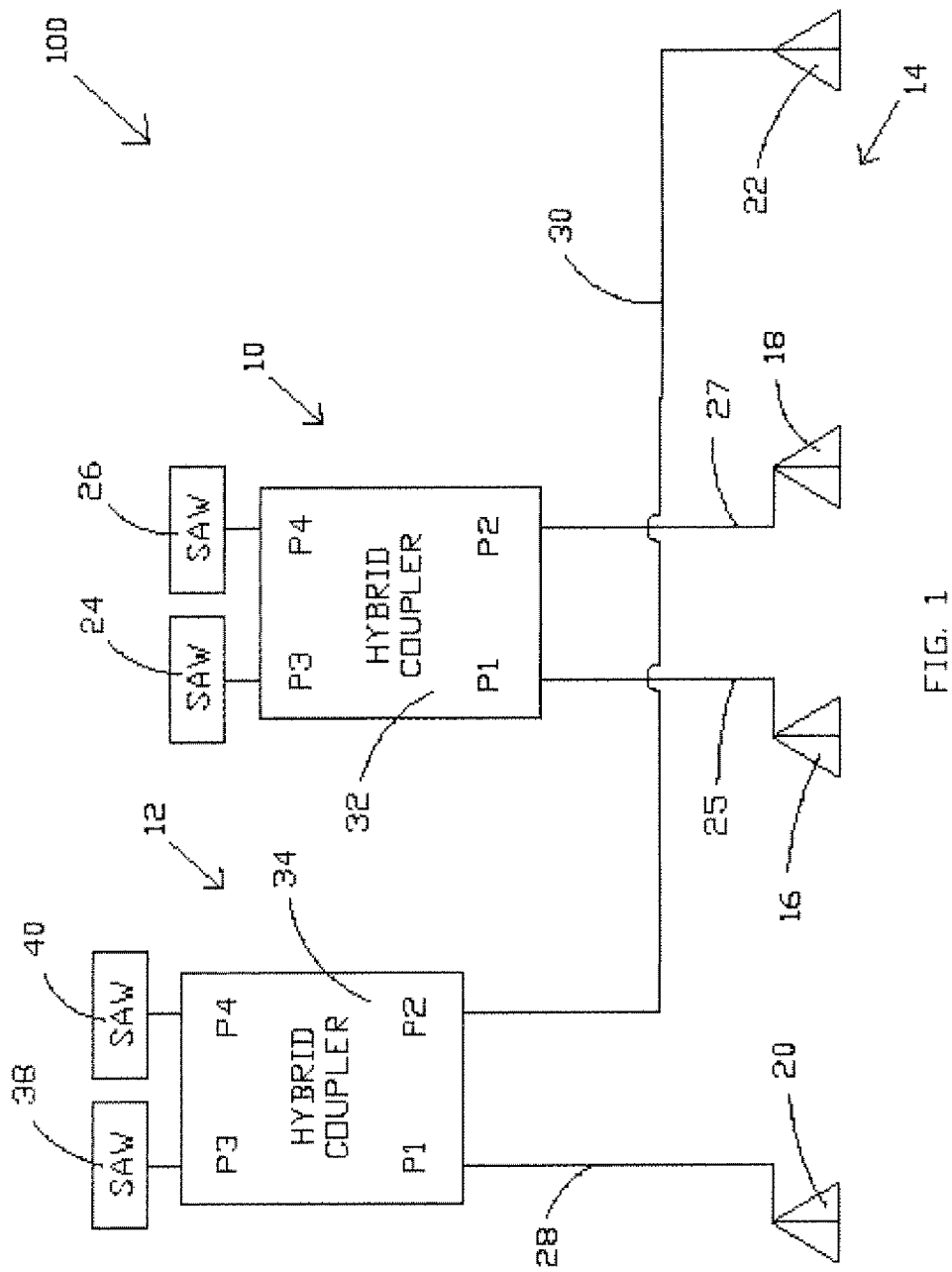
FIG. 1 is a schematic drawing that shows a four-element extended range passive wireless RFID tag assembly with multiple amplitude and phase-matched SAW devices in accordance with an embodiment described herein.

Exemplary embodiments of the invention will now be described with reference to the accompanying drawings. Like elements or components in the drawings are denoted with the same reference characters for consistency.

The exemplary embodiments described herein provide an enhanced range, passive radio frequency identification (RFID) tag system and components therefor. An RFID system comprises an interrogator and a passive wireless RFID sensor or tag, wherein the interrogator transmits a signal to the sensor, and the sensor returns a responsive signal that may further comprise identifying information by radio wave. In one embodiment of a passive wireless RFID sensor or transponder, the sensor further comprises a circuit commonly referred to as surface acoustic wave, or "SAW", device. During operation, such circuits have radio frequency acoustic waves (such as microwaves) travel on the surface of polished crystals. SAW circuits or SAW devices have been known in the related art at least since 1979, as shown in U.S. Pat. No. 4,169,286 to Uzunoglu et al., which is incorporated herein by reference in its entirety, and which shows the basic components of a SAW circuit or SAW device.

SAW devices may comprise a one-port configuration, typically using hemispherical or omni-directional antennas, e.g., dipole antennas or microstrip patch antennas. In one embodiment, SAW devices may comprise a thin-film, interdigital transducer (IDT) with multiple fingers located on a piezoelectric substrate. In a SAW-based passive RFID system, the antennas connected to the IDT receive the transmitted radio wave of the interrogator and pass the electrical signal to the IDT. The IDT then applies the electrical signal to a piezoelectric substrate to produce a surface acoustic wave that travels to an arrangement of signal reflectors also formed on the piezoelectric substrate. The surface acoustic wave reflected back to the IDT may be encoded based on the arrangement of the signal reflectors or of the IDT fingers. The piezoelectric substrate produces current that flows in the IDT, whereupon the current flows through the IDT to antennas that transmit a responsive radio wave. Upon receipt of the responsive radio wave, a digital signal processor in the interrogator may be used to detect the code produced by the arrangement of signal reflectors or of the IDT fingers. The range of frequency bandwidth used for operation may be dependent upon the separation between the IDT fingers, with higher frequencies corresponding to closer spacings.

U.S. Pat. No. 2,908,002, issued Oct. 6, 1959, to Van Atta (hereinafter referred to as "Van Atta patent"), which is hereby incorporated in its entirety, discloses an apparatus for reflecting an electromagnetic wave back in the same direction as the incident wave, thereby effectively providing a higher gain antenna. For each frequency within the band of interest, the phase distribution for the reflected signal at each array element or antenna is the complex conjugate of the received signal at that same element. More specifically, the array of antennas described in the Van Atta patent is achieved by connecting pairs of array elements such that the output of one element provides the input to its connected pair, and vice versa. The pairs are typically chosen such that they are uniformly and symmetrically disposed about an origin, or as nearly so as possible. For example, in a rectangular array of N×N uniformly spaced elements, the element designated by row i and column j is connected to the element designated by row N−i+1 and column N−j+1. Accordingly, in a one-dimensional array of four elements, the inner two elements are connected together, and the outer two elements are connected together. In this manner, the reflected signal is reflected in the direction of the incident wave. Thus, the term "Van Atta", when used in relation to an array, assembly, configuration, or pair of elements, such as antennas on a surface, means a combination having its elements interconnected so that the signal distribution of the reflected signal on the surface creates a time reversal of the incident signal distribution across that same surface, and, in so doing, a reflected signal in the direction of the incident signal. As indicated in the drawings of the Van Atta patent, the concept of a Van Atta array depends upon a transmission from one antenna port to another operatively connected antenna port. Passive SAW devices and other sensor tags, on the other hand, are typically reflective "1-port" devices with a single antenna.

The Applicants have discovered that, in at least one exemplary embodiment described herein, it is possible to utilize an arrangement known as a "Van Atta array" with 1-port devices, provided at least two "identical" SAW-based signal reflectors are utilized, e.g. SAW-based signal reflector 24 and SAW-based signal reflector 26 of FIG. 1. The term "identical" is explained and discussed in more detail below. In one embodiment, commercially available SAW devices described above may be utilized as the SAW-based signal reflectors. In another embodiment, SAW-based reflectors and/or other circuits described herein may be designed for application.

Referring now to FIG. 1, one exemplary embodiment is shown, wherein a passive wireless tag assembly 100 is created by combining a first passive wireless tag configuration 10 and a second passive wireless tag configuration 12. Passive wireless tag assembly 100 further comprises a four antenna "Van Atta array" 14 comprising antennas 16, 18, 20, and 22. Each passive wireless tag configuration 10 and 12 might be implemented independently of the other. For analysis purposes, a SAW-based tag configuration 10 is analyzed and described below as a stand-alone unit, although more than one of such configurations may be combined to form an assembly 100.

Increasing the number or pairs of SAW-based RFID tag configurations, such as SAW-based RFID tag configuration 10 and SAW-based RFID tag configuration 12 and/or additional SAW-based RFID tag configurations, or "tags", may be utilized to provide additional directivity, and hence additional range, of the resulting passive wireless tag assembly 100. Other SAW-based RFID configurations or tags may also be utilized to provide an increased range of operation as discussed hereinafter.

Spacing between antennas 16, 18, 20, and 22 may be controlled to avoid losses through grating lobes. The one-dimensional concept of the Van Atta patent has been extended to two-dimensional Van Atta arrays for additional directivity. Electrical transmission delays between antennas 16 and 18 may be the same as between 20 and 22. Alternatively, for narrow band operation, the electrical length between antennas 20 and 22 may be longer or shorter than the length between 16 and 18 by an integer factor number of wavelengths, wherein the narrower the band of operation is, the greater the permissible number of wavelengths. In one embodiment of passive wireless tag assembly 100, all four SAW-based signal reflectors 24, 26, 38, and 40 may be identical.

In the embodiment of FIG. 1, SAW-based signal reflectors 24, 26, 38, and 40 may further comprise an internal or built-in information circuit or mechanism (not shown) constructed and arranged to add information to the surface acoustic wave. This information circuit or mechanism may be provided by the arrangement or spacing of internal components of the SAW-based signal reflectors such as IDT fingers, by the spacing of the reflectors relative to one another, and the like. The so modified surface acoustic wave is then transformed into an electromagnetic wave that contains a particularized set of desired information or data. In other embodiments, the information circuit or mechanism may add information or data to an electromagnetic wave and/or to a surface acoustic wave. In other embodiments, filters or other circuits may be implemented using SAW devices or other circuits wherein frequency response patterns may be used as information circuits or mechanisms to add information to surface acoustic waves and/or to electromagnetic waves. Multiple information mechanisms may be used in combination with multiple SAW-based signal reflectors and/or other devices to provide the desired information that is added to the interrogator signal in a suitable manner. In one embodiment, the information circuit or mechanism acts in a way that may be strictly passive, i.e., without the use of a power supply, to provide a strictly passive wireless tag or tag assembly.

In one embodiment, identical SAW-based signal reflectors 24 and 26 may utilize a coupler, such as hybrid coupler 32, to couple SAW-based signal reflector 24 and SAW-based signal reflector 26 to antennas 16 and 18 for use in a Van Atta array. This approach avoids the requirement to rectify the received signal in order to power integrated circuits or switches, a requirement that has so far limited the range of passive RFID devices of the related art. As an example, hybrid coupler 32 may be a hybrid 3 dB, 90° directional coupler.

In another embodiment, additional identical SAW-based signal reflectors 38 and 40 may be coupled to antennas 20 and 22 via another coupler, such as hybrid coupler 34. When multiple SAW-based signal reflectors or other SAW devices are utilized to form passive wireless tag assembly 100, one embodiment would utilize at least one set of identical SAW-based signal reflectors, such as SAW-based signal reflectors 24 and 26, or 38 and 40 of FIG. 1.

While perhaps no manufactured articles are perfectly "identical" at the atomic or sub-atomic level, "identical" SAW-based signal reflectors, as such term is used herein, may be provided by manufacturing techniques wherein the same procedures, masks, piezoelectric materials, wafers, and the like are utilized to place the coded metal film, e.g. the interdigital fingers and reflectors, on the surface of the SAW-based signal reflector. However, any other manufacturing process that results in "identical" structures for the signal reflectors or other device or circuit being implemented, wherein the signals produced by each device are sufficiently matched in phase and amplitude response characteristics, may be utilized. Accordingly, the term "identical" is intended to mean in one embodiment, when used in reference to a pair of SAW-based signal reflectors or other signal reflectors, as meeting a tolerance level of plus/minus 10% with respect to each other in the reflected magnitude and plus/minus 10° with respect to each other in the reflected phase response, and in another embodiment the term "identical" is intended to mean as meeting a tolerance level of plus/minus 5% with respect to each other in magnitude and plus/minus 5° with respect to each other in the reflected phase response. In another embodiment, the term "identical" is intended to mean as satisfying a tolerance level of plus/minus 2% in magnitude and plus/minus 2° in phase with respect to each other, and in another embodiment the term "identical" is intended to mean as satisfying a tolerance level of plus/minus 1% and plus/minus 1° with respect to each other in measurements of magnitude and phase, respectively. In another embodiment, the term "identical", when used in reference to a set of signal reflectors or other devices described herein, is intended to mean that the devices may track in phase or in amplitude (i.e., magnitude) or in both within the above-stated ranges over an anticipated operational range of environmental conditions, such as temperature, pressure, and the like.

To explore use of the Van Atta configuration for an auto-tracking RFID tag system, which for analysis purposes is deemed to require perfectly matched components, consider a hybrid, 3 dB 90° branchline directional coupler 36, as illustrated in FIG. 2. Hybrid coupler 36, which may in one embodiment be utilized for implementing the hybrid couplers 32 and 34 of FIG. 1, is shown enlarged and in greater detail in FIG. 2. In this embodiment, hybrid coupler 36 comprises conductive material that is configured to be a microstrip or stripline circuit. The symbol "$\lambda_k$" may be used to refer to the wavelength of the guided wave on the circuit structure of the hybrid coupler. The characteristic impedances found at ports P1 and P2 may typically be represented by the symbol $Z_c$. Similarly, the characteristic impedance of the transmission line connected to port interface P3, may also typically be represented by the symbol $Z_c$. In one embodiment, the RFID signal reflectors that would be connected to the transmission line may present effective impedance different from $Z_c$. In one embodiment, the hybrid couplers utilized herein may be miniaturized, such as by the process of embedding the conductive material in high dielectric superstrates and substrates, by employing metamaterial designs, or by embedding within one of the SAW-based signal reflectors or other signal sensing devices. In one embodiment, lengths 46 and 48 may be $\lambda_k/4$.

While reference to the first passive wireless tag 10 is or will be made as though it were used by itself without any additional tag, such as second tag 12, the same discussion could be applied to the second tag 12, when used by itself.

Continuing with reference to FIGS. 1 and 2, the four ports for the hybrid coupler 32 are indicated as P1, P2, P3, and P4. The same notation is used for hybrid coupler 34 of FIG. 1 and the represented branchline coupler 36 of FIG. 2. For analysis purposes wherein only input signals are considered, Port 1 may initially be considered to be an input port for an input signal such as a signal from Antenna 16. Ports 3 and 4 are each terminated with "identical" SAW-based signal reflectors 24 and 26, respectively. Port 3 may then be referred to as an "in-phase" port, and Port 4 may be referred to as a "quadrature port." The term "quadrature port" may be used for Port 4 because the output signal from Port 4 going into signal reflector 26, which results from an input signal at Port 1, lags the output signal from Port 3 going into signal reflector 24 by 90°. Port 2 may be referred to as an isolation port due to its isolation from Port 1 in the absence of reflections from Ports 3 and 4. However, as discussed below, the signals reflected from signal reflectors 24 and 26 produce an output from Port 2. The voltage S-parameters in phasor notation corresponding to the hybrid coupler outputs at P3 and P4, $S_{31}$ and $S_{41}$ respectively, in response to input at P1 are as follows:

$$S_{31} = 1/\sqrt{2},$$

$$S_{41} = 1/\sqrt{2}\, e^{-j\pi/2}.$$

Half of the signal power into Port 1 exits Port 3 and arrives at signal reflector 24. The signal enters signal reflector 24 and is encoded to impart a detectable ID number, other information, and/or optionally, sensor information as discussed further below. The reflected signal becomes an input to Port 3.

Similarly, half of the signal power into Port 1 exits Port 4 and arrives at signal reflector 26, although this signal lags the signal at Port 3 by 90°. This signal undergoes an encoding by signal reflector 26 that is identical to that imparted by signal reflector 24, and becomes an input to Port 4. Since hybrid coupler 32 is reciprocal, the signal reflected by signal reflector 24 is divided to Ports 1 and 2, and the signal reflected by signal reflector 26 is also divided to Ports 1 and 2. However, the signal path from signal reflector 26 (Port 4) to Port 1 entails a 90° delay relative to the signal path from signal reflector 24 (Port 3) to Port 1, as shown in FIG. 1. Thus, at Port 1, the reflected signal, due to an input at Port 1, is zero since the signal emanating from signal reflector 26 lags that emanating from signal reflector 24 by 180° at Port 1. This relationship is shown mathematically as:

$$S_{31}S_{13}v(t)+S_{41}S_{14}v(t)=(\tfrac{1}{2}+\tfrac{1}{2}e^{-j\pi})v(t)=0,$$

where the RFID-encoded signal is denoted by v(t). Furthermore, the signal path from signal reflector 24 to Port 2 entails a 90° delay relative to the path from Port 4 to Port 2, so that the reflections from signal reflector 24 and signal reflector 26, based on an input at Port 1, add in phase at Port 4. This relationship is represented mathematically as:

$$S_{31}S_{23}v(t)+S_{41}S_{24}v(t)=(\tfrac{1}{2}e^{-j\pi/2}+\tfrac{1}{2}e^{-j\pi/2})v(t)=-jv(t).$$

Therefore, a signal input into Port 1 will become encoded by signal reflectors 24 and 26 and will exit Port 2. Similarly, a signal input into Port 2 will become encoded by signal reflectors 24 and 26 and will exit Port 1. These relationships are precisely the requirements for a Van Atta array when Port 1 and Port 2 are each connected to a different antenna. First passive wireless tag 10 and second wireless tag 12 may be used independently of each other, in which case signal reflectors 24 and 26 are identical, or nearly so, and signal reflectors 38 and 40 are identical, or nearly so, and distinct from signal reflectors 24 and 26. Or, first passive wireless tag 10 and second passive wireless tag 12 may be used in combination to provide extended range and dual-antennas, in which case the antennas 16, 18, 20, 22 are placed in a Van Atta configuration, and each may utilize a quadrature hybrid directional coupler and identical signal reflectors 24, 26, 38, and 40.

Reviewing now in more detail an embodiment of passive wireless tag 100 as shown in FIG. 1, four antennas 16, 18, 20, and 22 are utilized to provide an extended range passive wireless tag. In an embodiment with multiple tag devices, all SAW-based signal reflectors 24, 26, 38, and 40 may be identical and phase matched. In one embodiment, the insertion losses and phases for the entire transmission paths between antennas 20 and 22 are approximately the same as those between antennas 16 and 18, including hybrid couplers, transmission line or waveguide, and connectors. A meandering or additional transmission line portion between antennas 16 and 18 (not shown) may be used to achieve a particular balance of interest. However, it should be noted that, in general, the transmission path between antenna 20 and P1 of hybrid coupler 34 is not required to be balanced with respect to the transmission path between antenna 22 and P2 of hybrid coupler 34. Also, in one embodiment, SAW-based signal reflectors are sufficiently identical that they will phase track over anticipated operational environmental changes, such as temperature. Because some types of SAW-based signal reflectors and/or other types of SAW-based devices are temperature sensitive, co-location on a metallic surface, or other surface of high thermal conductivity, may be desirable to maintain phase and amplitude balance between the Van Atta pairs.

Figure 4:
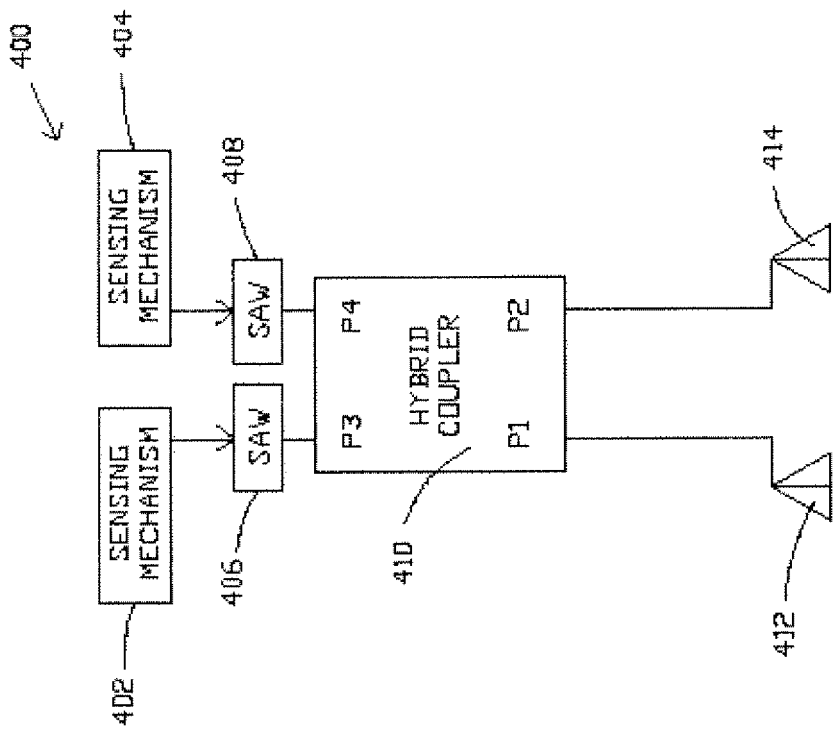
FIG. 4 is a schematic drawing of another embodiment of a passive wireless tag assembly using two sensing mechanisms coupled to multiple SAW devices and a hybrid coupler.
Figure 3:
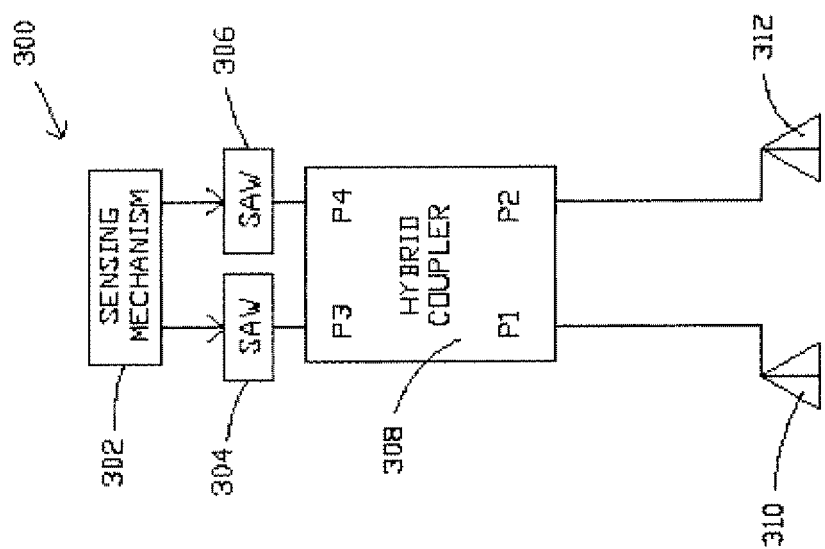
FIG. 3 is a schematic drawing of one embodiment of a passive wireless tag assembly using a single sensing mechanism coupled to multiple SAW devices in combination with the hybrid coupler exemplified in FIG. 2.

In addition to identification, the exemplary embodiments described herein may be used to provide an extended range for various types of sensors as indicated by passive wireless tags 300 and 400 in FIGS. 3 and 4, respectively. In general, sensor information is obtained when an external influence affects the propagation properties of the SAW-based devices, or the electromagnetic properties of an attached device, such as an attached radio frequency device utilized as a sensing mechanism.

In one embodiment, signal reflectors 304, 306 and 406, 408 of FIGS. 3 and 4, respectively, may be considered to function as 2-port devices wherein one port of each SAW device connects to a hybrid coupler, such as hybrid couplers 308 and 410. The other port may connect to a sensing mechanism such as sensing mechanism 302 and 402. Similar to the previously described embodiment of FIG. 1, hybrid coupler 308 may be connected to antennas 310 and 312. Hybrid coupler 410 may be connected to antennas 412 and 414. Thus, the embodiments of passive wireless tags 300 and 400 may comprise multiple antenna configurations as shown in FIG. 1 to provide additional steering and/or 2-dimensional arrays.

In another embodiment, the signal reflectors and/or additional sets of signal reflectors formed on a piezoelectric substrate, as discussed hereinbefore, may be attached through the second port to the sensing mechanism. In another embodiment, the sensing mechanism may be provided by a single chip wherein a passive SAW-based device is modified accordingly. Thus, the sensing mechanism acts as an information mechanism, or circuit, constructed and arranged to add information to at least one of a surface acoustic wave or an electromagnetic wave.

Sensor information for SAW-based sensors may be utilized to provide information related to, but not limited to, pressure, force, strain, linear and angular position, acceleration, rotation rate, flow rate, liquid viscosity or density, normal and transverse electrical field, voltage, liquid conductivity, magnetic field, temperature, radiation dose, and thin film thickness. Such sensors may comprise biosensors, multiple chemical analyzers, and the like. The exemplary embodiments described herein provide configurations for extending the range of use of passive sensors.

In another embodiment, one or more sensing mechanisms may affect an encoding operation of all SAW-based signal reflectors encoding devices identically. Ranges for "identical" effects on the encoding operation with respect to the returned signal phase and magnitude are consistent with the ranges that have been discussed above.

FIG. 3 shows a passive wireless tag 300 comprising passive, reflection-based sensors. Here, a single sensing mechanism, such as sensing mechanism 302, is connected to the second ports of and affects SAW-based signal reflectors 304 and 306. The sensing mechanism may also be provided as part of SAW-based signal reflectors 304 and 306, such that an external sensing mechanism 302 is not utilized. As discussed above, sensing mechanism 302 may act directly or indirectly as an information mechanism constructed and arranged to add information to the interrogator signal by affecting a surface acoustic wave or an electromagnetic wave.

In one non-limiting example of operation, lithium niobate SAW-based devices may be used for temperature sensing based on the sensitivity of the acoustic propagation factor to temperature, provided that all of the SAW-based devices are at the same temperature so that the RF signals from all such devices are of the proper phase. To achieve nearly identical temperatures at each SAW-based device, tags may be designed with paths of high thermal conductivity to connect all SAW-based devices. SAW-based sensors may utilize means to affect surface acoustic waves and/or radio frequency waves.

In another embodiment, the reflector fingers on a SAW-based signal reflector may function as broadband reflectors, such that for the incident energy arriving at a reflector within the SAW-based device, the reflected energy is predominantly a flat response across the spectrum of the incident energy. Alternatively, the reflector fingers may instead be high Q resonators such that, of the incident energy arriving at a single reflector, or resonator, within the SAW-based signal reflector, the reflected energy is restricted to essentially one frequency or a narrow band of frequencies. In this particular embodiment, the returned pulses are effectively single frequency or narrow-frequency band pulse trains with varying delay between them.

FIG. 4 shows yet another embodiment of an RFID sensing device. Passive wireless tag 400 utilizes two separate sensing mechanisms 402 and 404, which affect encoding of respective SAW-based signal reflectors 406 and 408, respectively. In one application of passive wireless tag 400, the sensing mechanisms 402 and 404 may be mounted so that the physical trait being sensed, e.g., pressure, may be nearly the same at each sensing mechanism 402 and 404. The sensing mechanism outputs may then be "identical" as the term is discussed hereinbefore, so as to affect "identical" SAW-based signal reflectors 406 and 408 in the same way. As discussed above, sensing mechanisms 402 and 404 may act directly or indirectly as an information mechanism configured and arranged to add information to the interrogator signal by affecting a surface acoustic wave or an electromagnetic wave.

FIG. 5A illustrates a hybrid, dihedral-Van Atta array "corner" retro-reflector 1000 comprising array elements to provide horizontal and vertical steering in accordance with an embodiment of a passive wireless RFID sensor assembly. Retroreflector 1000 provides the horizontal steering because of the dihedral configuration of plates 1001 and 1002, and it provides the vertical steering because of the Van Atta array configuration on panel 1001. Array elements 1003 on plate 1002 are identical antenna elements with zero or more individual element feed ports identically terminated. In yet another embodiment, panel 1002 is a flat conductive plate with no array elements (not shown). Panel 1001 comprises two or more Van Atta assemblies, 1004 and 1005. Each of the two or more Van Atta assemblies contains one or more Van Atta configurations or pairs 1006.

FIG. 5B represents a hybrid dihedral-Van Atta array corner retro-reflector 1100 comprising array elements and passive modulation devices to provide vertical steering, horizontal steering, and reflector identification in accordance with an embodiment of a passive wireless tag assembly. Retroreflector 1100 comprises plates 1101 and 1102, with vertical steering being provided by the Van Atta configuration on plate 1101. Array elements 1103 on panel 1102 are identical elements with zero or more individual element feed ports identically terminated. In another embodiment (not shown), panel 1102 is a flat conductive plate with no array elements. Panel 1101 comprises two or more Van Atta, assemblies as columns, 1104 and 1105. Each of the two or more columns contains one or more Van Atta configurations or pairs 1106, and each Van Atta pair 1106 comprises two antenna elements 1108 and a passive modulation circuit, 1107. In one embodiment, the passive modulation circuit 1107 comprises a reflection mode SAW device with a hybrid coupler. In another embodiment, the passive modulation circuit 1107 is a through-mode SAW circuit. In another embodiment, all antenna elements 1108 on panel 1101 are identical, and all passive modulation circuits 1107 on panel 1101 are identical.

Referring now to FIG. 5C, a hybrid dihedral retro-reflector 1200 is shown that comprises array elements and SAW-based devices to provide horizontal steering and reflector identification in accordance with another embodiment of a passive wireless tag assembly. The retro-reflector 1200 provides reflector identification and horizontal steering due to the dihedral configuration of plates 1201 and 1202. In one embodiment, array elements 1203 on panel 1202 are identical elements with zero or more individual element feed ports identically terminated. In another embodiment (not shown), panel 1202 is a flat conductive plate with no array elements. In another embodiment, each antenna element 1204 on plate 1201 is connected to a corresponding passive modulation circuit 1207.

Another embodiment of a passive wireless tag assembly is represented in FIG. 5D, which provides a hybrid dihedral retro-reflector 1300 for reflector identification, horizontal steering due to dihedral plates 1301 and 1302, and vertical steering due to Van Atta assemblies as columns 1304 and 1305. Antenna elements on plate 1302 are attached to passive modulation circuit 1307 that encode identification information to the incident signal. In one embodiment, the passive modulation circuit 1307 comprises a SAW-based device.

Figure 5E:
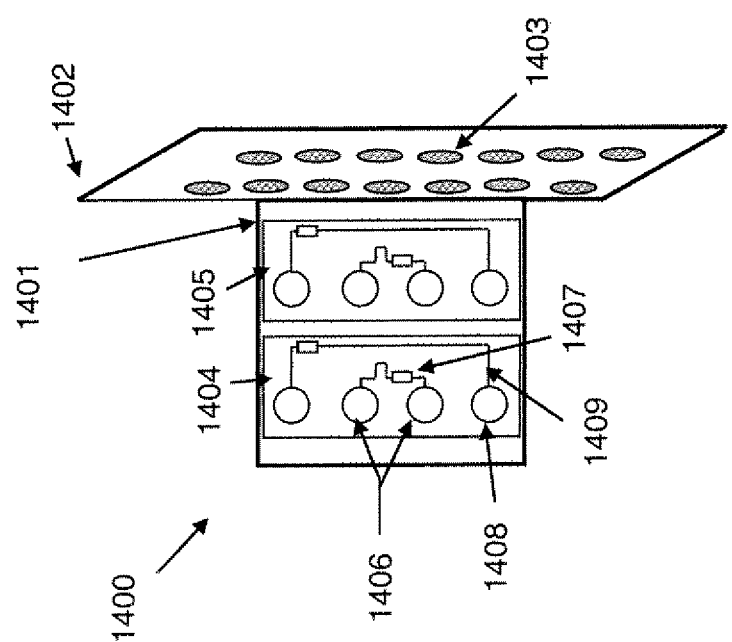
FIG. 5E illustrates a hybrid dihedral-Van Atta retro-reflector comprising array elements, an extended panel, and passive modulation circuits to provide vertical steering, horizontal steering, and reflector identification in accordance with another embodiment of a passive wireless tag assembly.

Referring now to FIG. 5E, another embodiment of a passive wireless tag assembly provides a hybrid dihedral retroreflector 1400 for reflector identification, horizontal steering due to dihedral plates 1401 and 1402, and vertical steering due to two Van Atta assemblies represented as columns 1404 and 1405. In such an embodiment, array elements 1403 on panel 1402 are identical elements with zero or more individual element feed ports identically terminated. Panel 1401 contains two or more columns, 1404 and 1405. Each of the two or more columns comprises one or more Van Atta pairs 1406, and each Van Atta pair 1406 comprises two antenna elements 1408 and a passive modulation circuit 1407. In one embodiment, the passive modulation circuit 1407 is a reflective mode SAW-based device with a hybrid coupler. In another embodiment, the passive modulation circuit 1407 is a through mode SAW-based device. In another embodiment, all antenna elements 1408 on panel 1401 are identical, and all passive modulation circuits 1407 on panel 1401 are identical. As shown in FIG. 5E, this embodiment has similar components to the embodiment described in FIG. 5B, but the vertical dimension of plate 1402 is greater than the vertical dimension of plate 1401. This type of configuration enhances the vertical steering functionality of the embodiment. Such modification of the vertical dimensions of one of the plates would also serve such enhanced functionality for the other hybrid dihedral embodiments described herein, and is considered to be within the scope of embodiments described. Alternatively, in another similar embodiment, the vertical dimensions of plate 1401 and 1402 are approximately equal, but the columns 1404 and 1405 are configured so that they do not extend the full vertical distance of the plate 1401.

Figure 5F:
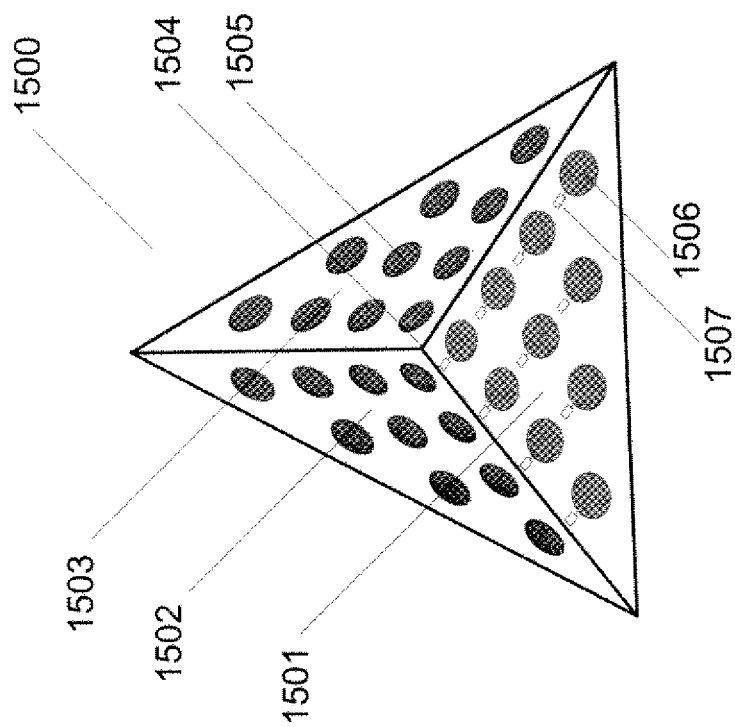
FIG. 5F depicts a hybrid corner reflector in the shape of a cube corner comprising array elements and SAW-based devices to provide vertical steering, horizontal steering, and reflector identification in accordance with another embodiment of a passive wireless tag assembly.

Yet another embodiment of a passive wireless tag assembly is given in FIG. 5F. FIG. 5F depicts a discretized cube corner retro-reflector 1500 for reflector identification and horizontal and vertical steering due to the corner configuration of three plates 1501, 1502, and 1503. In one embodiment, array elements 1505 on panels 1502 and 1503 are identical elements with zero or more individual element feed ports identically terminated. In another embodiment, panels 1502 and 1503 are flat conductive plates with no array elements. Each antenna element 1506 on plate 1501 is connected to a passive modulation circuit 1507.

Referring again to FIG. 5A, a dihedral reflector 1000 may comprise two orthogonal conductive plates, such as conductive plates 1001 and 1002, which are characterized by an interior angle of approximately 90°. A dihedral reflector scatters incident energy back toward the direction of the incident field; i.e., in the direction of the source, provided that the propagation vector of the incident field does not have a significant z-component and that the predominant portion of incident field arrives within the 90° angle; i.e., not on the back side of the corner reflector. In other words, the dihedral reflector 1000 provides retro-reflection when the propagation vector of the incident field does not have a component that is parallel to the intersection line of the two plates (1001 and 1002) as shown by the vector 1011 of FIG. 5A. Although full three-dimensional retro-reflection can be achieved by a cube corner reflector, such as one formed by the three plates 1501, 1502, and 1503 of FIG. 5F, similar functionality can be achieved with a dihedral retro-reflector by employing a hybrid configuration comprising Van Atta assemblies on one of the two plates, such as assemblies 1004 and 1005. The panel 1001 is "discretized" in the sense that a continuous reflector panel 1001 is replaced by an array of antenna elements that are not terminated with matched loads. In one embodiment, the assemblies 1004 and 1005 comprise pairs (1006) of antenna elements that are Van Atta pairs. The Van Atta assemblies provide for steering in the z-direction (vector 1011) while the horizontal steering is achieved by the dihedral panels. Plate 1002 is discretized with antenna elements 1003 that are not terminated with matched loads. In another embodiment, plate 1002 is a conductive plate without antenna elements.

FIG. 5B provides another embodiment for a passive wireless tag assembly, which for descriptive convenience may also be referred to as "discretized" retroreflector 1100. In such embodiment, passive wireless tag or hybrid retro-reflector 1100 is formed by combining a traditional microwave dihedral reflector, such as the dihedral reflector formed by conductive plates 1001 and 1002, with a Van Atta array capable of transmitting an identifying signal. The dihedral reflector described in FIG. 5A does not impart any type of identification within the reflected signal. To provide the identification function for the retro-reflector 1100 in FIG. 5B, conductive plate 1101 contains arrays of antenna elements; e.g., microstrip patch elements 1108. Each of the microstrip patch elements 1108 on one plate has a feed line, such as feed line 1109, that connects each two antenna pairs in a Van Atta configuration. Each feed line 1109 contains a passive modulation circuit 1107. In one embodiment, the passive modulation means 1109 comprises one or more SAW devices and one or more hybrid couplers that act to encode the signal received by the antenna elements with an identification code. In another embodiment, the passive modulation circuit 1107 comprises one or more through mode SAW devices that act to encode the signal received by the antenna elements with an identification code. Thus, hybrid dihedral-Van Atta array retro-reflector 1100 provides identification in addition to vertical and horizontal steering, whereas hybrid dihedral-Van Atta array retro-reflector 1000 does not provide encoded identification information.

The discretized dihedral reflector 1200 in FIG. 5C provides horizontal retro-reflection due to joined conductive plates 1201 and 1202. In addition, each antenna element 1204 on plate 1201 is connected to a passive modulation circuit 1207, which is not terminated with a matched load. Passive modulation circuit 1207 encodes the incident signal in order to provide retro-reflector identification. In one embodiment, plate 1202 is also discretized with antenna elements that are not terminated with matched loads. In another embodiment, plate 1202 is a conductive plate that is not discretized.

The discretized dihedral reflector 1300 in FIG. 5D provides vertical retro-reflection due to the Van Atta assemblies configured as columns 1304 and 1305 and horizontal retro-reflection due to joined plates 1301 and 1302. In this embodiment, plate 1302 is discretized with antenna elements 1303, and each element 1303 is terminated with a passive modulation circuit 1307 that encodes the incident signal with identification. In one embodiment, the passive modulation circuit 1307 is a SAW-based device. Plate 1301 is discretized with columns 1304 and 1305 of Van Atta pairs 1306.

In another embodiment, cube corner retro-reflector 1500 of FIG. 5F comprises plates 1501, 1502, and 1503 that intersect at vertex 1504 such that the three surfaces meet at approximately right angles. In one embodiment, zero or more of plates 1502 and 1503 are discretized with antenna elements 1505. Plate 1501 is discretized with antenna elements 1506 that are connected to a passive modulation circuit 1507 responsible for encoding the identification information to the incident signal. In one embodiment, the passive modulation circuit 1507 is a SAW-based device.

FIG. 6 illustrates another embodiment described herein for a passive wireless tag assembly. As with previously discussed embodiments, passive wireless tag assembly 600 may also integrate one or more SAW-based devices into a Van Atta array comprising antenna elements 602 and 604 with the objective of providing increased range or signal to noise ratio for an RFID or RF-sensor system.

As noted hereinbefore, the embodiments described herein may utilize SAW-based devices that are commercially available to provide for relatively low cost implementation. The embodiments described herein may also utilize SAW-based signal reflectors that are not presently commercially available, but which may become commercially available in the future, and/or may be produced as needed, and/or may be produced in a manner that may be programmable by the user.

FIG. 6 shows a possible architecture for passive wireless tag assembly 600. Specifically, delay block 608 represents a microwave delay line with an associated time delay, τ. The delay line is formed from a two-port SAW-based device with an interdigital transducer at the first port to change the incident microwave electromagnetic signal into a surface acoustic wave, and a second interdigital transducer at the second port to convert the surface acoustic wave back into an electromagnetic wave.

Figure 7:
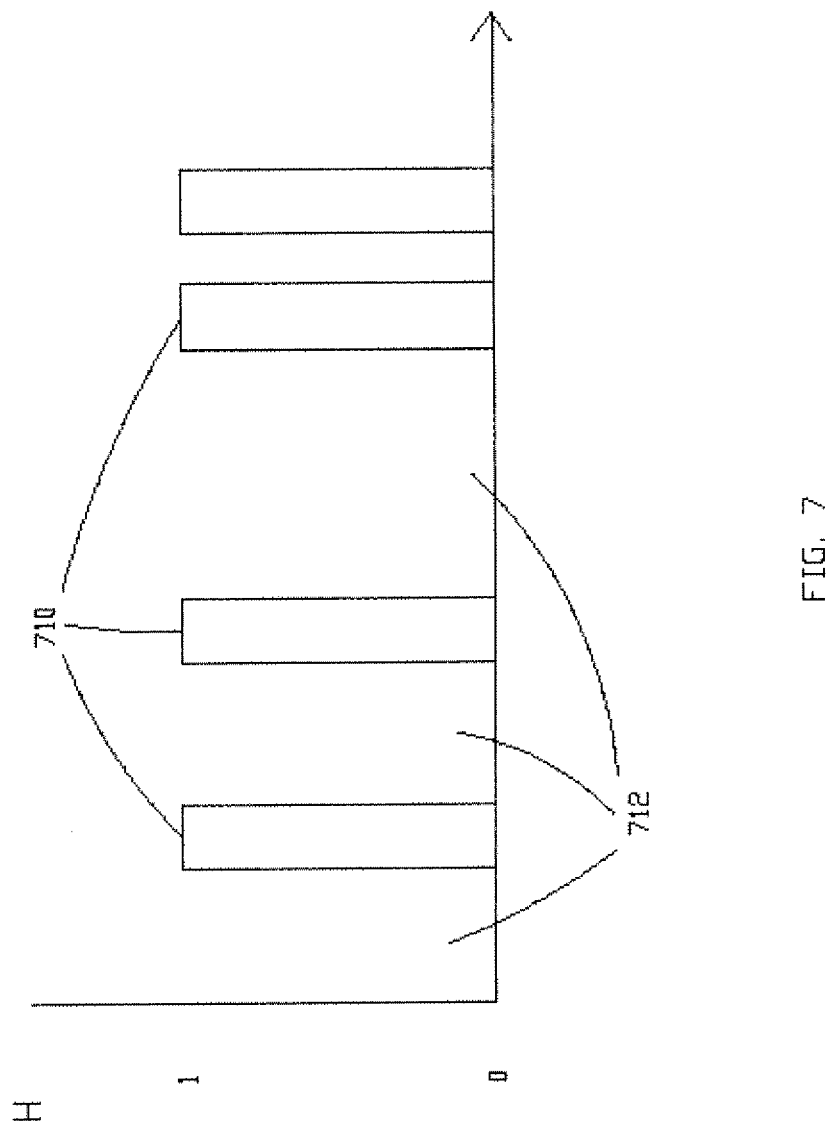
FIG. 7 is a plot of the amplitude of frequency response H as a function of frequency that may be implemented for an embodiment of a passive wireless tag assembly.

Block 610 may represent a frequency responsive circuit such as a bandpass filter with a response that is a function of frequency, H(f). In one embodiment, the frequency function may comprise frequency pass band sections 710 and frequency reject or stop band sections 712, as shown in FIG. 7. Pass bands 710 may be indicated with a relative level of value of 1, and the stop bands or reject sections 712 may be indicated at relative level of value of 0. Energy with a frequency band within pass band sections 710, for instance band $f_1$, incident at one port of block H(f) 610, will be passed with little or no insertion loss between the first and the second ports of block H(f) 610.

Energy (i.e., an electromagnetic signal of interrogation) not residing in one of the pass bands, but instead in one of the stop bands, or rejection sections 712, is not reflected back toward the direction of the in-coming wave to the same degree as energy flowing through the passband of filter H(f). In other words, energy arriving from antenna 602 would be reflected back toward antenna 602, and similarly energy arriving from antenna 604 would be reflected back to antenna 604. The pattern of pass bands and receive bands may be utilized as a technique to provide identification on the tag. Thus, block 610 may act as an information circuit or information mechanism constructed and arranged to add information to the interrogator signal received by assembly 600 by affecting a surface acoustic wave and/or an electromagnetic wave.

Also shown in FIG. 6 is an interrogator 650 comprising a transmitter and receiver system, 654, which may be co-located or separated. The transmitter and receiver system 654 is operatively connected to an antenna 652 that may be used for both transmission and reception of signals. Alternatively, interrogator 650 may comprise antenna 652 for transmitting signals and another separate antenna 653 operatively connected to transmitter/receiver 654 for receiving signals, whereby the interrogator would be described as operating in a "bi-static" mode.

Operation of passive wireless tag assembly 600 in one embodiment may proceed as follows. In response to a signal from the interrogator 650, passive wireless tag 600 may produce several signals. A first, lower-level signal may be produced at time $t \approx t_0$, where $t_0$ is the two-way propagation delay corresponding to the time for the electromagnetic signal to traverse the distance from the interrogator 650 to antenna 604, reflect from block H(f) 610, and traverse back again to the interrogator 650 from antenna 604. This example is a non-steered signal. Because the first received signal corresponds to the energy reflected from filter H(f) 610, the spectrum of the first received signal is given by $\breve{H}(f)=1-H(f)$, in which the peak levels of the passband have been normalized to 1, as indicated in FIG. 7. A third lower-level non-steered signal may be received at a time $t \approx t_0 + 2\tau$. This third lower-level signal arrives at the tag through antenna 602, travels through delay block 608 with delay $\tau$, reflects from the filter 610 H(f), travels back through the delay circuit, exits antenna 602 and arrives back at the interrogator 650. The strongest response, which may be referred to as a "Van Atta response", is received at time $t \approx \tau + t_0$. This response is stronger than the first and third responses because this signal travels from one antenna to the next in order to form a Van Atta pair with increased directivity. The spectrum of the "Van Atta response" signal is H(f).

To maximize the received signal-to-noise ratio, the received signal may be correlated with the matched filter response, H(f). In one embodiment, the stop bands or reject sections may be kept as narrow as possible to pass as much energy while still providing information.

In another embodiment, two identical filters, H(f), are disposed on either side of the delay line 608. In this embodiment, both stop-band signals arrive at the approximate time $t_0$, and no significant component arrives at time $t_0 + 2\tau$. This configuration presents an advantage to the configuration shown in FIG. 6 because energy arriving at time $t_0 + 2\tau$ could possibly interfere with other more distant tags or with tags having a larger delay.

In another embodiment, the interrogator 650 may detect or use only the "Van Atta response", which will typically be significantly larger in terms of signal strength than the first and third signal, which are not augmented by the Van Atta configuration of antennas, to increase the directivity of the return signal. The interrogator may determine the delay, $t_0$, using the "Van Atta response" and the known delay value, $\tau$. The interrogator may then perform a correlation between the signal received at time $t_0$ and the known signal corresponding to $\breve{H}(f)$, and add this result to the correlation between the signal received at $t \approx t_0 + 2\tau$ and the known signal corresponding to $\breve{H}(f)$. In this manner, the interrogator 650 can utilize signal energy from parts of the spectrum that are rejected by filter H(f) as well as those that are passed by filter H(f) or the "Van Atta response". This embodiment may find application when the number of Van Atta pairs is small. However, the array may comprise many elements, and all signals based upon the reflection from filters operating with response as a function of frequency (H(f)) will be scattered in a direction away from the interrogator, except for the case in which the direction vector of the incident signal is normal to the surface.

In another embodiment, delay block 608 may comprise a SAW delay line, such as a SAW-based device described hereinbefore. Block H(f) 610 may comprise a separate filter component, which may also be realized with a SAW-based device. In another embodiment, the delay block 608 and the block H(f) 610 may be fabricated onto a monolithic SAW-based device.

In the embodiment of FIG. 6, the time separation between the passband spectral components is assumed to be very small; i.e., all spectral components are assumed to arrive back at the interrogator 650 at approximately the same time. In passive wireless tag assembly 800, shown in FIGS. 8A and 8B, the spectral components are determined by frequency responsive circuits such as filters 810. Filters 810 may be temporally spaced apart, or separated by a series of time delays $\tau_N$, which may be designated as delays 808. In one embodiment, all time delays, $\tau_N$ are distinct. Each filter 810 acts to pass one or more select bands of frequencies. Accordingly, filter 810 may act directly or indirectly as an information circuit or mechanism operable for adding information to the interrogator signal by affecting a surface acoustic wave and/or an electromagnetic wave. For the embodiment shown in FIG. 8B, the spectral component corresponding to the Van Atta response through the $N^{th}$ filter is received at the interrogator at approximate time $t_i \approx t_0 + \tau_N$, where $t_0$ is the two-way propagation delay corresponding to the time for the electromagnetic signal to traverse the distance from the interrogator 650 to the tag 600 and back to the interrogator 650. In addition, two significant "non-Van Atta" responses result from the stop bands reflecting from either side of the filter 810, $H_N(f)$. One is received back at the interrogator at approximate time $t_0$, whereas the other "non-Van Atta" response is received at time $t_0 + 2\tau_N$.

In another embodiment of RFID tag assembly 800, any signal that enters through antenna 802, and is reflected back through antenna 802, does not coincide temporally with the signal that enters through antenna 802 and exits through antenna 804. Likewise, in this particular embodiment, any signal that enters through antenna 804, and is reflected back through antenna 804, does not coincide temporally with the signal that enters through antenna 804 and exits through antenna 802. These temporal requirements are achieved with delays 808 by proper selection of delay times, $\tau_N$.

Figures 8A, 8B:
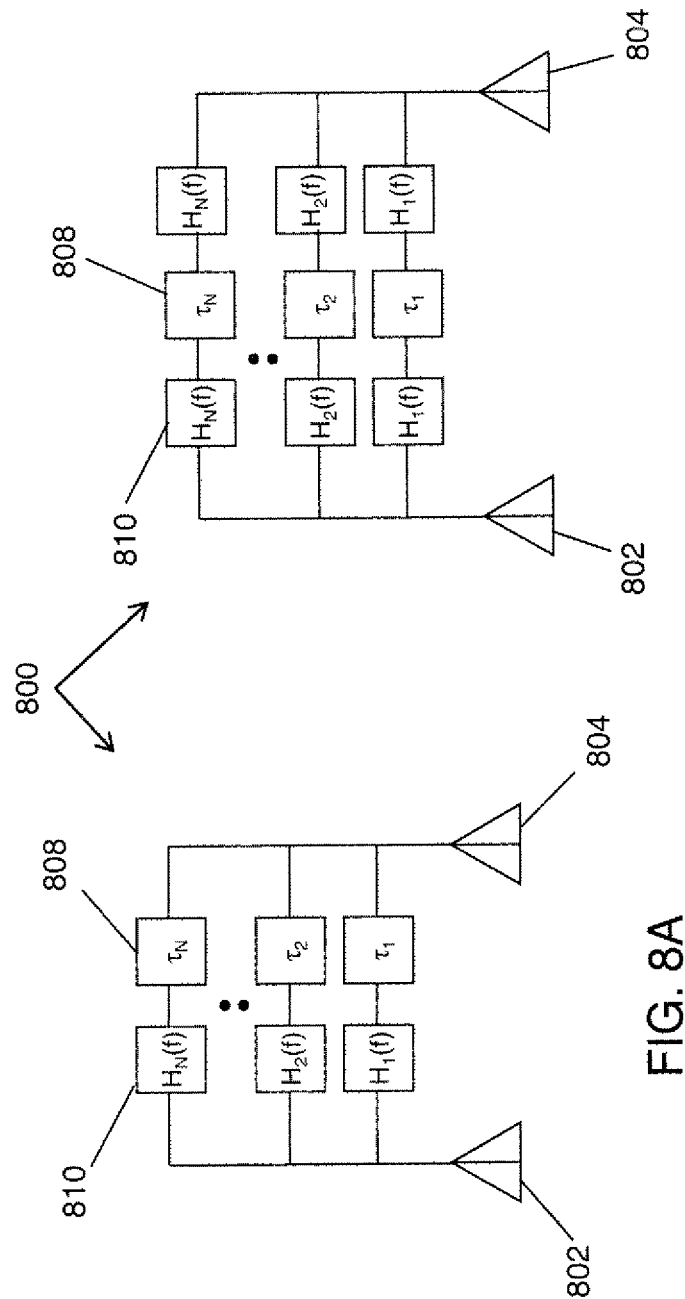
FIG. 8A represents a passive wireless RFID tag with at least one frequency-dependent signal reflector and at least one interposed time delay in accordance with another embodiment.
FIG. 8B demonstrates a passive wireless tag with a symmetric plurality of frequency-dependent signal reflectors and a corresponding number of interposed time delays in accordance with another embodiment.

In another embodiment shown in FIG. 8B, two identical filters, $H_N(f)$, are disposed on either side of each delay, $\tau_N$. This embodiment, compared to that shown in FIG. 8A, provides both significant "non-Van Atta" responses being received at the interrogator at approximate time $t_0$; i.e., there is not a significant "non-Van Atta" response at time $t_0 + 2\tau_N$ that could possibly overlap and interfere with Van Atta responses at that approximate time.

To maximize the received signal-to-noise ratio, the received signal may be correlated with the matched filter response, for the entire circuit between antenna 802 and antenna 804. In one embodiment, all delays 808 and filters 810 may be fabricated on a single SAW-based chip. However, passive wireless tag assembly 800 may also comprise multiple components to provide the function of delay and of filtering.

In yet another embodiment, an RFID tag system 901 as exemplified in FIG. 9 comprises an interrogator 950 combined with an associated passive wireless tag assembly 900. Interrogator 950 of FIG. 9 employs a transceiver 962 that provides for transmit and receive functions. The transceiver transmits one code within an orthogonal set of codes. Each transmitted code has a frequency spectrum $H_r(f)$, which is the complex conjugate to the corresponding tag assembly filter 910. The signal is transmitted from interrogator antenna 952 toward the passive wireless tag assembly 900 comprising at least one Van Atta pair of antennas as shown in FIG. 9. The interrogator signal is received by antennas 902 and 904 and is retransmitted by antennas 904 and 902. In this embodiment, correlation is achieved at the single tag configuration for which the tag code constitutes the matched filter response to the transmitted code. All remaining tag configurations possess codes that are orthogonal to the transmitted codes, and hence do not return substantial signals. In this manner, each response by a tag configuration, and potential sensor information, is uniquely identified. In another embodiment, the transceiver 962 transmits a band-limited signal with essentially flat spectral response over the passband of the tag configuration. Each passive wireless tag configuration (such as the tag configurations 10 and 12 of FIG. 1) is characterized with a unique code from an orthogonal set. This code is echoed to the interrogator antenna 952 by the Van Atta pair of antennas 902 and 904. In this embodiment, the transceiver 962 performs the correlation process to derive the unique identification, and possibly sensor information, associated with the tag configuration or tag assembly.

It should be noted that achieving collision avoidance with an orthogonal signal set is considered a code division multiple access (CDMA) approach known by those of ordinary skill in the art. However, it has not been previously determined how to use this technique and/or components for implementing such techniques in conjunction with Van Atta antenna arrays. It should also be noted that, although shown in FIG. 9 for a 2-antenna Van Atta array, the technique of this embodiment can be extended for multiple Van Atta pairs along one or two dimensions.

Accordingly, the embodiments described herein include a strictly passive wireless tag assembly comprising at least one passive wireless tag which may produce identification information and/or sensor information. The passive wireless tag responds to a wireless interrogator signal from an interrogator. One possible example of an interrogator is provided as interrogator 950, although numerous other interrogators may be utilized. The strictly passive wireless tag reflects a return signal derived from the wireless interrogator signal wherein the return signal contains added information. Use of a strictly passive wireless tag avoids loss of power that is used to bias semiconductor devices as in pseudo-passive RFID devices. Pseudo-passive devices contain DC bias mechanisms that require a minimum receive voltage in order to rectify it, thereby greatly restricting achievable range of operation.

The embodiments described herein may comprise at least one SAW-based device and may contain multiple SAW-based devices such as SAW-based signal reflectors 24, 26, 38, 40, 304, 306, 1107, 1207, and 1307. In various embodiments, SAW-based devices may be used to implement sensing mechanisms 302, 402, 404, delays 608, 808, and/or bandpass filters or similar functional elements 610, 810, 910, and the like. SAW-based devices may be utilized to construct and arrange circuits to receive an incoming electromagnetic wave, transform the electromagnetic wave into a surface acoustic wave, and then transform the surface acoustic wave back into a subsequent electromagnetic wave. Various information circuits or information mechanisms are described, which are constructed and arranged to add information to at least one surface acoustic wave(s) or electromagnetic wave(s). A plurality of antennas and transmission lines are interconnected with the SAW device(s) and the information circuit or information mechanism. The antennas and transmission lines are constructed and arranged to receive the wireless interrogator signal and transmit a return signal predominantly in the direction from whence the interrogator signal came.

While a few exemplary embodiments of this invention have been described in detail above, a person of ordinary skill in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A passive wireless tag assembly responsive to a wireless interrogator signal from an interrogator by reflecting a return signal derived from the wireless interrogator signal, the return signal containing information added by said passive wireless tag assembly, said passive wireless tag assembly comprising:

at least one SAW circuit operable for receiving the wireless interrogator signal as an incoming electromagnetic wave, transforming the electromagnetic wave into a surface acoustic wave, and then transforming the surface acoustic wave back into a subsequent outgoing electromagnetic wave serving as the return signal;

an information circuit constructed and arranged to add information to at least one of the surface acoustic wave, the incoming electromagnetic wave, and the subsequent outgoing electromagnetic wave;

at least one pair of antennas, each pair connected in a Van Atta array by transmission lines with one another and with said at least one SAW circuit and said information circuit and being constructed and arranged to receive the wireless interrogator signal and transmit the return signal in a direction from whence the wireless interrogator signal came;

a first conductive surface and a second conductive surface connected at a right angle to one another to form a corner reflector for providing vertical and horizontal steering of the interrogator signal, said at least one pair of antennas being positioned on said first conductive surface; and at least one passive modulation circuit positioned on said first conductive surface and operatively connected to the SAW circuit to provide vertical steering of the interrogator signal, the passive wireless tag assembly further comprising at least one antenna positioned on said second conductive surface to provide horizontal steering of the interrogator signal and to form, in conjunction with said first conductive surface, a dihedral corner reflector.

2. The passive wireless tag assembly of claim 1, wherein said passive wireless tag assembly is operable without a DC power supply and without means for rectifying the interrogator signal.

3. The passive wireless tag assembly of claim 1, wherein said at least one SAW circuit comprises a plurality of SAW-based signal reflectors, each of said plurality of SAW-based signal reflectors comprising a single port, wherein each of said plurality of SAW-based signal reflectors are operable for receiving the wireless interrogator signal as the incoming electromagnetic wave at said single port, transforming the incoming electromagnetic wave into the surface acoustic wave, and then transforming the surface acoustic wave back into the subsequent outgoing electromagnetic wave for transmission from said single port.

4. The passive wireless tag assembly of claim 3, further comprising at least one directional coupler connected to each of said plurality of SAW-based signal reflectors.

5. The passive wireless tag assembly of claim 4 wherein the directional coupler is a 3 dB, 90° hybrid coupler.

6. The passive wireless tag assembly of claim 3, wherein said plurality of SAW-based signal reflectors are matched to each provide an output for the subsequent outgoing electromagnetic wave such that each of said plurality of SAW-based signal reflectors meet a tolerance of plus/minus 10% or less with respect to each other for magnitude and of plus/minus 10 degrees with respect to each other for phase response of the subsequent outgoing electromagnetic wave.

7. The passive wireless tag assembly of claim 3, wherein said information circuit is constructed and arranged to produce a passive wireless tag identification number.

8. The passive wireless tag assembly of claim 3, wherein said information circuit is constructed and arranged to provide information from measurement of at least one physical phenomenon.

9. The passive wireless tag assembly of claim 1, wherein said at least one SAW circuit comprises at least one SAW device comprising at least two signal ports, wherein said at least one SAW device is operable for receiving the incoming electromagnetic wave at a first of said at least two signal ports, transforming the incoming electromagnetic wave into the surface acoustic wave, and then transforming the surface acoustic wave back as the subsequent outgoing electromagnetic wave for transmission from a second of said at least two signal ports, and wherein each of said at least two signal ports is connected to a different one of said pair of antennas connected in a Van Atta array.

10. The passive wireless tag assembly of claim 9, wherein said information circuit comprises a pass band filter operatively connected with a time delay.

11. The passive wireless tag assembly of claim 10, wherein said information circuit is implemented by the at least one SAW device.

12. The passive wireless tag of claim 1, wherein said information circuit comprises one or more resonators.

13. A passive wireless radio frequency identification tag system comprising:
an interrogator operable to produce a wireless interrogator signal; and
a passive wireless tag assembly comprising,
at least one delay circuit operable for delaying an electromagnetic wave entering said at least one delay circuit by a predetermined time delay τ;
at least one frequency responsive circuit comprising a transfer function that is a function of frequency, and wherein said circuit is operable for adding information to said wireless interrogator signal, said information being derived from said transfer function; and
at least one pair of antennas, each pair of antennas being operatively connected with a corresponding one of said at least one delay circuit and one of said at least one frequency responsive circuit, and each antenna being configured to receive the wireless interrogator signal, for creating a time reversal of the incoming electromagnetic wave such that the subsequent outgoing return signal transmits predominantly in a direction from whence said interrogator signal came,
wherein for each combination of said at least one pair of antennas operatively connected with a corresponding one of said at least one delay circuit and of said at least one frequency responsive circuit, such combination is configured to produce at least three signals in response to said wireless interrogator signal, wherein only the return signal is steerable in the direction from whence the interrogator signal came, wherein the return signal is received at said interrogator at a time $t \approx \tau + t_0$, $t_0$ being a variable known as two-way propagation delay corresponding to a two way travel time of a distance between said interrogator and said passive wireless tag assembly, and wherein a first additional non-steered signal is produced from said passive wireless tag assembly and received by said interrogator at a time $t \approx t_0$, and a second additional non-steered signal is produced from said passive wireless tag assembly and received by said interrogator at a time $t \approx 2\tau + t_0$.

14. The passive wireless tag of claim 13, wherein the delay circuit is fabricated as a SAW device.

15. The passive wireless tag of claim 13, wherein at least two frequency responsive circuits and one delay circuit are fabricated on a single SAW device.

16. A passive wireless radio frequency identification tag system comprising:
an interrogator operable to produce a wireless interrogator signal; and
a passive wireless tag assembly comprising,
at least one delay circuit operable for delaying an electromagnetic wave entering said at least one delay circuit by a predetermined time delay τ;
at least two frequency responsive circuits for each at least one delay circuit, each responsive circuit comprising a transfer function that is a function of frequency, and wherein said circuit is operable for adding information to said wireless interrogator signal, said information being derived from said transfer function; and
at least one pair of antennas, and each antenna being configured to receive the wireless interrogator signal, for creating a time reversal of the incoming electromagnetic wave such that the subsequent outgoing return signal transmits predominantly in a direction from whence said interrogator signal came,
wherein each antenna of said at least one pair of antennas is operatively connected to one of said two frequency responsive circuits at a first port of each, wherein each corresponding delay circuit is operatively connected to a second port of each of the two frequency responsive circuits so as to be positioned therebetween in order to produce at least three signals in response to said wireless interrogator signal, wherein only the return signal is steerable in the direction from whence the interrogator signal came, wherein the return signal being transmitted is received at said interrogator at a time $t \approx \tau + t_0$, $t_0$ being a two-way propagation delay corresponding to a two way travel time of a distance between said interrogator and said passive wireless tag assembly, wherein a first additional non-steered signal, corresponding to out-of-band components of a first of the two frequency responsive circuits, is received from one antenna of said at least one pair of antennas, reflected by the first frequency responsive circuit, transmitted by the same one antenna of said at least one pair of antennas, and received by said interrogator at a time $t \approx t_0$, and a second additional non-steered signal, corresponding to out-of-band components of the second of the two frequency responsive circuits, is received from the other antenna of said at least one pair of antennas, reflected by the second frequency responsive circuit, transmitted from the other antenna of said at least one pair of antennas, and received by said interrogator at a time $t \approx t_0$.

\* \* \* \* \*